United States Patent
Stewart et al.

(10) Patent No.: US 9,468,330 B2
(45) Date of Patent: *Oct. 18, 2016

(54) DOMESTIC SWEET TEA BREWING PRODUCT AND PROCESS

(71) Applicants: Paul Alan Stewart, Mobile, AL (US); Adam Paul Stewart, Mobile, AL (US)

(72) Inventors: Paul Alan Stewart, Mobile, AL (US); Adam Paul Stewart, Mobile, AL (US)

(*) Notice: Subject to any disclaimer, the term of this patent is extended or adjusted under 35 U.S.C. 154(b) by 461 days.

This patent is subject to a terminal disclaimer.

(21) Appl. No.: 13/965,498

(22) Filed: Aug. 13, 2013

(65) Prior Publication Data
US 2014/0314913 A1    Oct. 23, 2014

Related U.S. Application Data

(63) Continuation-in-part of application No. 13/867,526, filed on Apr. 22, 2013.

(51) Int. Cl.
| | | |
|---|---|---|
| B65D 85/804 | (2006.01) | |
| A47J 31/40 | (2006.01) | |
| A23F 3/18 | (2006.01) | |
| A47J 31/00 | (2006.01) | |
| B65D 81/32 | (2006.01) | |
| A23F 3/40 | (2006.01) | |
| A47J 31/06 | (2006.01) | |

(52) U.S. Cl.
CPC .............. A47J 31/407 (2013.01); A23F 3/405 (2013.01); A47J 31/002 (2013.01); B65D 81/3261 (2013.01); B65D 85/8046 (2013.01); *A47J 31/0642* (2013.01)

(58) Field of Classification Search
CPC ............ B65D 85/8043; B65D 85/804; B65D 85/8046; B65D 85/808; B65D 81/3484; A23F 3/40; A23F 3/405; A47J 31/40; A47J 31/407
See application file for complete search history.

(56) References Cited

U.S. PATENT DOCUMENTS

| | | |
|---|---|---|
| 2,362,459 A | 11/1944 | Barnett |
| 2,791,324 A | 5/1957 | Knoop et al. |
| 2,791,505 A | 5/1957 | Barnett |
| 3,186,850 A | 6/1965 | Anthony |
| 3,809,215 A | 5/1974 | Dobry |
| 4,853,234 A | 8/1989 | Bentley et al. |
| 5,895,672 A * | 4/1999 | Cooper ............... A47J 31/0615 426/433 |
| 2005/0247207 A1 | 11/2005 | Saint |
| 2007/0172552 A1* | 7/2007 | Davies ................ B65D 85/808 426/84 |
| 2008/0171110 A1 | 7/2008 | Stuart |
| 2010/0159076 A1 | 6/2010 | Purliyev |

OTHER PUBLICATIONS

Mesh to micron conversion chart. Oct 2007.*
Nordic Sugar (https://web.archive.org/web/20091220003545/http://www.nordicsugar.com/industry/granulated-sugar/) Dec. 2009.*

* cited by examiner

*Primary Examiner* — Erik Kashnikow
*Assistant Examiner* — Lela S Williams
(74) *Attorney, Agent, or Firm* — Thomas L. Moses; Southeast IP Group, LLC.

(57) ABSTRACT

A sweet tea brewing product and system for brewing sweet tea is disclosed including making a concentrated sweet tea solution before mixing with water which comprises at least one water permeable mesh pouch wherein tea particles and sugar granules are contained. The tea particles and sugar granules are brewed and dissolved during steeping in hot water to produce a hot concentrated sweet tea solution. The concentrated tea solution is then mixed with a proportioned amount of water to make consistent sweet tea.

12 Claims, 5 Drawing Sheets

DOMESTIC SWEET TEA BREWING PRODUCT AND PROCESS

This is a continuation-in-part of U.S. patent application Ser. No. 13/867,526, entitled TEA BREWING AND SWEETENING PRODUCT AND PROCESS, filed on Apr. 22, 2013, incorporated herein by reference.

The invention relates to the consistent brewing of sweet tea and particularly to the provision of a tea and sugar blended product and method for brewing in a domestic coffee/tea drip or commercial machine.

BACKGROUND OF THE INVENTION

In tea brewing, such as in restaurants and in the home, there is a lack of consistency from one batch of tea to the next. The industry uses standard sugar to sweeten tea, and the industry standard is basically one pound of sugar per gallon of tea, which gives a brix of about 11. Brix is a measure (degree) of the sugar content of an aqueous solution. One degree Brix is one gram of sucrose in 100 grams of solution and represents the strength of the solution as a percentage by weight (% w/w). If the solution contains dissolved solids other than pure sucrose, then the Brix only approximates the dissolved solid content. The Brix is traditionally used in tea, wine, sugar, fruit juice, and honey industries to measure sweetness. Brewed sweetened tea has a typical Brix level of 10½ to 11. The problem is one usually does not have a scale to weigh out one pound of sugar per gallon of tea so the Brix level varies from one pot or urn of tea to the next.

A commercial tea brewing urn typically holds at least 3 gallons of tea and has a brewing basket. A paper filter is placed in the basket and then filled with the tea. Hot water flows into the brewing basket to steep the tea in the basket, and concentrated tea solution is passed into the urn. At the same time, cold water is being delivered into the urn, and the concentrated tea solution and cold water are mixed to make tea. However, when the sugar is added, the temperature of the tea is much cooler so that the sugar is not totally dissolved. Domestic tea machines used in the home, and some restaurants, typically are like drip coffee machines. In domestic brewing the same products and techniques are used, that is, tea is brewed to produce a tea concentrate, then water is added to dilute the tea concentrate, and then the tea solution is sweetened with sugar. For example, there are two typical methods for brewing tea domestically, and each method is made with one teabag to make one quart of brewed tea solution. In the first method, 2 cups of water is brought to a boil on the stove. The boiling water is poured into a tea pitcher on top of one teabag and allowed to steep for 3 to 5 minutes. After steeping, the teabag is removed from the tea solution, and sufficient sugar is added to sweeten the tea to a desired taste profile, that is, a quarter pound or less, and in some instances more. Once sweetened, two additional cups of water are added to the tea pitcher to dilute the sweet tea concentrate. In a second method, a quarter ounce teabag is placed in the brew basket of a domestic coffee maker. Then, 2 cups of water are poured into the coffee maker. The coffee maker will dispense hot water over the teabag to brew a tea concentrate delivered into the coffee pot. The tea concentrate is then poured into a tea pitcher and sweetened to a desired level. Once sweetened, 2 cups of water are poured into the pitcher to dilute the sweet tea concentrate. However, these methods do not provide an effective way to sweeten tea, particularly, in a consistent and accurate manner.

Various attempts have been made to package tea and sugar together in separate compartments for use as an infusion product which is immersed in hot water. US Published Application No. 2010/0159076 A1 shows a floatable infusion package that may include tea and sugar in separate compartments. US Published Application No. 2008/0171110 A1 shows a foraminous plastic vertical tube that can contain tea and sugar, or other solids, which is rigid enough to grip and stir in a liquid to dissolve or infuse its contents. U.S. Pat. No. 2,362,459 discloses an infusion package and the manufacture thereof that includes compartments A and B wherein one compartment contains tea and the other compartment contains sugar. US Published Application No. 2005/0247207 A1 shows a drink infusion device, including tea, having a submersible element and a buoyant retrievable element. U.S. Pat. No. 3,809,215 shows a floating infusion package for tea. U.S. Pat. No. 2,791,505 shows an infusion package having one compartment filled with tea and another compartment filled with sugar. Other patents show various other means of packaging tea and/or sugar. U.S. Pat. No. 2,791,324 discloses a compartmented package that may include tea in one compartment, sugar in another, and creamer in another compartment, which may be poured into a cup of hot water. U.S. Pat. No. 3,186,850 discloses an infusion package containing beverage ingredients, such as powdered tea and sugar carried by a cup, wherein the ingredients are poured into the cup containing hot water. U.S. Pat. No. 4,853,234 discloses a rigid beverage package that can contain any desired beverage ingredients. None of the prior art has provided a way to make sweetened tea accurately and consistently. The floating infusion products are not practical or suitable for use in a brewing basket.

Accordingly, an object of the invention is to provide an accurate and consistent way of brewing sweetened tea.

Another object of the invention is to provide a sweet tea brewing product and method for use in a drip tea/coffee machine which provides an accurate and consistent way of brewing sweetened tea.

Another object of the present invention is to provide sources of tea particles and sugar granules which can be brewed together in prescribed blend ratios in a brewing basket to form a concentrated sweet tea solution that enters the urn hot with sugar dissolved.

Another object of the invention is to provide a mesh pouch containing tea and sugar in a prescribed blended ratio for use in the brewing basket of a drip coffee machine to brew tea accurately and consistently.

Another object of the present invention is to provide a sweetened tea product whereby one may pull a brew basket out of the tea maker and place a mesh thermoplastic pouch containing a prescribed blend ratio of tea and sugar, and push a start button to brew sweet tea consistently, time and time again. This will provide a huge step in the ice tea market.

SUMMARY OF THE INVENTION

The above objectives are accomplished according to the present invention by providing a tea brewing system for brewing sweetened tea comprising a tea brewing machine having a removable brewing basket and a brewing pot or urn. A known source of tea particles and sugar granules is provided for placement into the brewing basket during brewing. At least one water permeable mesh pouch contains the source of tea particles and sugar granules having a mesh size for retaining the tea particles and sugar granules. The machine includes a hot water dispenser for dispensing hot water into the brewing basket to steep the tea particles and sugar granules in hot water in the basket and extract tea and dissolve sugar in the water permeable pouch to produce a hot concentrated sweet tea solution. The concentrated sweet tea solution is added to water. In this manner, the tea is already effectively sweetened when it is added to the water. The water may be in the same container the hot concentrated tea solution is delivered to, or the container may be a separate container of water the concentrated sweet tea solution is poured into. Preferably, the blend ratio of tea to sugar is in the range of ⅕ to ½₅, and the sources of tea particles and sugar granules are retained in one of a thermoplastic or cotton mesh pouch and blended together in a prescribed blend ratio. The pouch may be a single pouch or include a first compartment for the tea particles and a second compartment for the sugar granules. The first and second compartments may be joined together at a fold line so the tea compartment folds over the sugar compartment in the brewing basket. Preferably, the pouch has a mesh selected from a range of about 50 to 300 microns, and the size of the sugar granules is in the range of U.S. mesh sieve nos. 3-35. A method of brewing sweetened tea comprises providing a tea brewing machine having a pot or urn, a brewing basket carried above the pot, and the a hot water dispenser for delivering hot water into the brewing basket. At least one mesh pouch containing a prescribed blend of tea particles and sugar is placed into the brewing basket. Hot water is dispensed into the brewing basket for steeping the tea particles and sugar granules to produce a flow of hot concentrated sweet tea solution from the brewing basket. In the hot concentrated sweet tea solution, the sugar is generally totally dissolved in the solution with the tea. The hot concentrated sweet tea solution is added to water which may be in the same or a separate container.

DESCRIPTION OF THE DRAWINGS

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
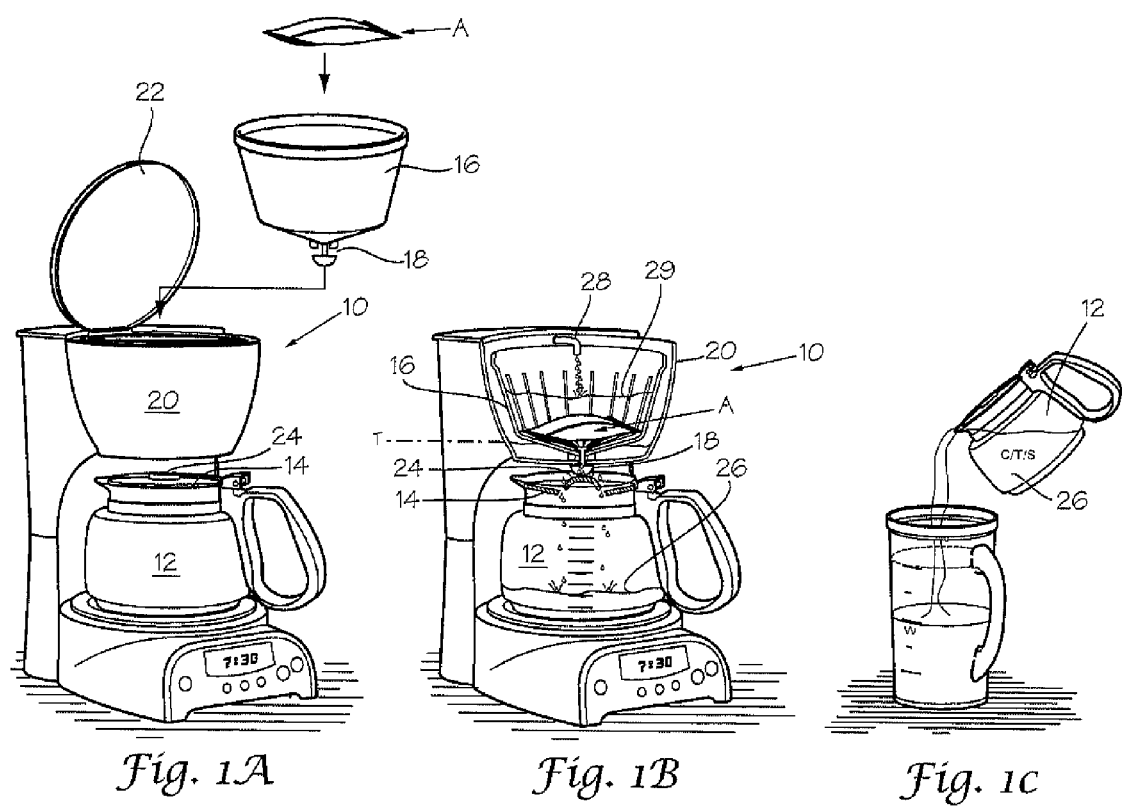
FIG. 1A is a left front perspective view with parts removed illustrating a tea brewing machine having a brew basket for containing tea sweetening and brewing products according to the invention.
FIG. 1B is a left perspective view with the basket holder and brewing basket cut away.
FIG. 1C is a perspective view of adding a concentrated sweet tea solution to a proportioned amount of water to produce consistent sweetened tea.

Referring now to the drawings, the invention will be described in more detail.

As can best be seen in FIG. 1, a tea brewing machine 10 is illustrated having a tea container 12, such as a pot, urn, etc., with a lid 14. A brewing basket 16 includes a bottom outlet 18 through which a hot, concentrated sweet tea solution 26 flows during brewing. Brewing basket 16 is carried in a basket holder 20, in a conventional manner and a lid 14 covers the basket holder. Above the brewing basket is a hot water dispenser 28 for delivering hot water into the basket. Lid 14 includes an inlet opening 24 through which the concentrated sweet tea solution enters into the container. A main aspect of the invention is a sweet tea brewing product, designated generally as A, which is placed in the brewing basket before brewing. The brewing basket may be a circular cup basket or a funnel basket.

Figure 2:
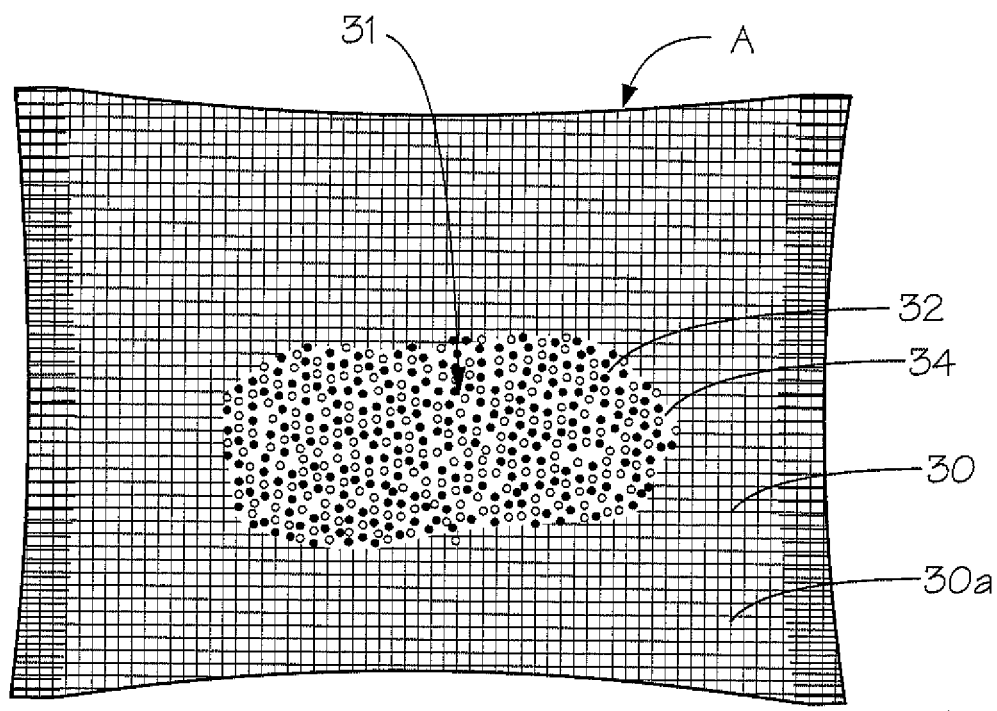
FIG. 2 is a top plan view illustrating a product containing a blend of tea particles and sugar granules retained in specified blend ratios contained in a water permeable mesh pouch for use in brewing sweet tea.
Figure 3:
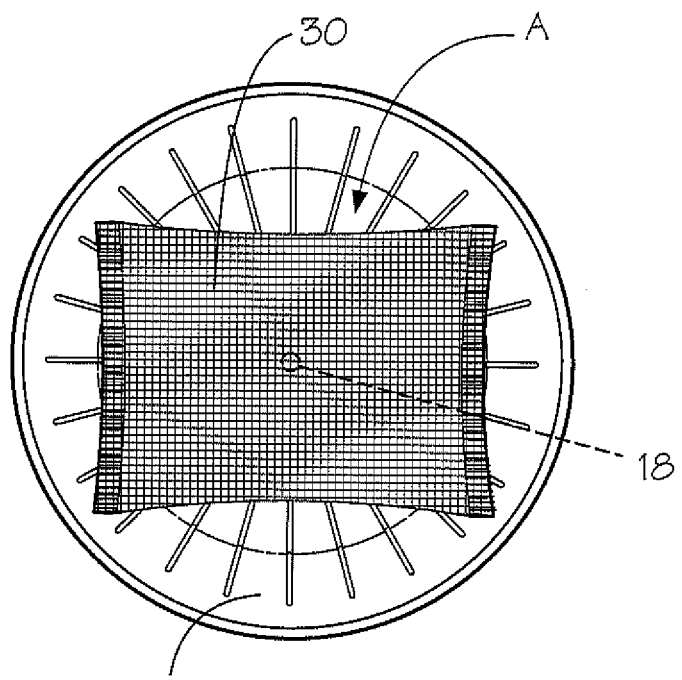
FIG. 3 is a top plan view of a tea brewing and sweetening product placed inside a brewing basket according to the present invention.

As can best be seen in FIGS. 2 and 3, a tea brewing and sweetening product A is illustrated which contains a prescribed blend of tea particles and sugar granules blended according to the present invention. Product A includes a pouch 30 in which a blend of tea particles 32 and sugar granules 34 are contained. Pouch 30 is preferably made from a mesh polymer material having a predetermined mesh size to retain the blend while allowing the tea to be extracted and the sugar granules to dissolve in the brewing basket. It is important to note that in previous methods of brewing tea, sugar is added to the tea solution after it is brewed and has been cooled. Sugar used to sweeten the tea is thus dissolved in a cool tea solution, reducing its ability to be dissolved.

FIG. 2 shows mesh pouch 30 cut away to show the tea and sugar blend 31 of tea 32 and sugar 34 contained in the pouch. FIG. 3 shows the tea/sugar brewing pouch placed in brewing basket 16 of the tea brewing machine. As the hot water fills the filter basket, pouch 30 generally becomes submerged in hot water 29. The steeping of the tea particles and sugar extracts the tea and dissolves the sugar producing a hot concentrated, sweet tea solution dispensed through the basket outlet 18 into container 12 through container lid opening 24. Because the sugar is steeped in hot water, all the sugar is dissolved and much more than when sugar is added to the tea solution after brewing in the urn. Sweet tea brewing product A may also be steeped in 2 cups of boiling water in a container to make the concentrated sweet tea solution. Then two cups of water are added to the concentrated tea solution to create the proportioned amount of tea solution. Either way, the Brix of the solution is consistent since the same blend of tea particles and sugar granules is known.

Pouch 30 is preferably constructed from any suitable FDA approved polymeric material such as nylon, polyester, polypropylene, or polyethylene in a woven or nonwoven material, and preferably is 4"×4" to 6"×6" in size. In some applications, it may also be possible to utilize a cotton nonwoven or woven fabric. The term mesh is meant to include a fabric or material having defined regular openings such as in a woven material, screen, etc., or random openings such as found in a non-woven material like a thin web of fibrous materials, scrim, etc. which may provide the same permeability. For example, a non-woven fibrous web with a polyester/polypropylene blend may be used. Sugar refiners run sugar through a series of sieves rated with a US mesh number. The granules of a certain size get caught or retained in the sieve with smaller holes than the size of the granule. This is done in order to provide uniform size granules to the market. Typically, the sugar found in grocery stores and restaurants are of a small particle and are retained in a mesh sieve the size of 45-120. The smaller the mesh number, the larger the granules of sugar are, and the larger the mesh sizes, the smaller the granules of sugar are. The pouch mesh is preferably selected from a range of 50 to 300 microns. It has been found according to the present invention that an advantageous sieve size for the sugar of the present invention is that retained by US sieve numbers 3-35. Thus, the sugar granules are retained in the pouch brewing until they are dissolved with the tea.

Figure 4:
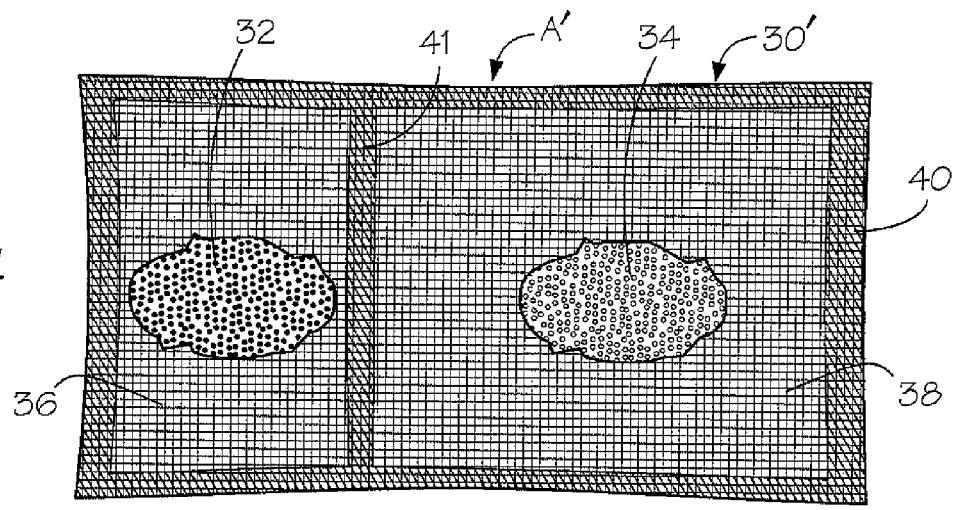
FIG. 4 is a top plan view illustrating another embodiment of a sweet tea brewing product wherein a mesh pouch has two compartments for retaining the tea and sugar.
Figure 5:
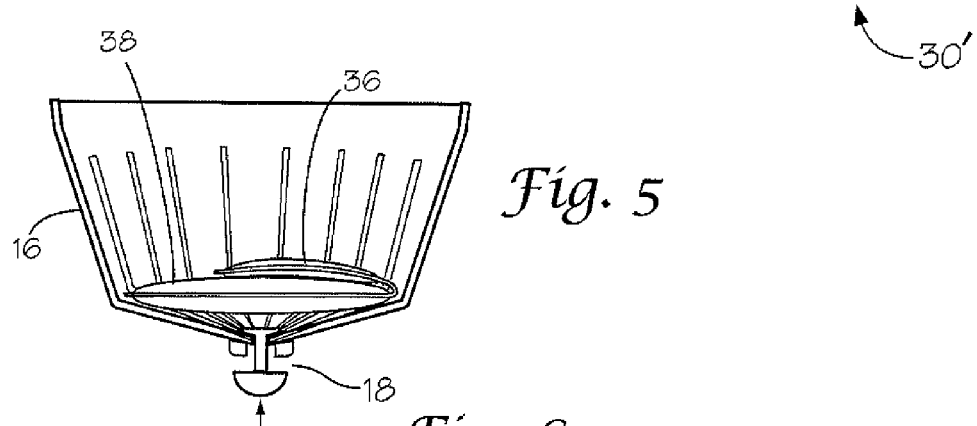
FIG. 5 is a side cut away illustrating the pouch folded when placed in a brewing basket.

Referring now to FIG. 4, an alternate embodiment of the invention is illustrated for a tea sweetening product A' wherein the tea particles 32, sugar granules 34, are contained in separate compartments 36 and 38 of pouch 30'. Each compartment is formed from a mesh material as disclosed for product A shown in FIGS. 1 through 3. The tea compartment is folded over the sugar compartment during brewing as shown in FIG. 5. The two compartment pouch includes a seal 40 around the pouch and a seal 41 dividing the pouch into compartments 36 and 38 and providing a fold line.

Figure 6:
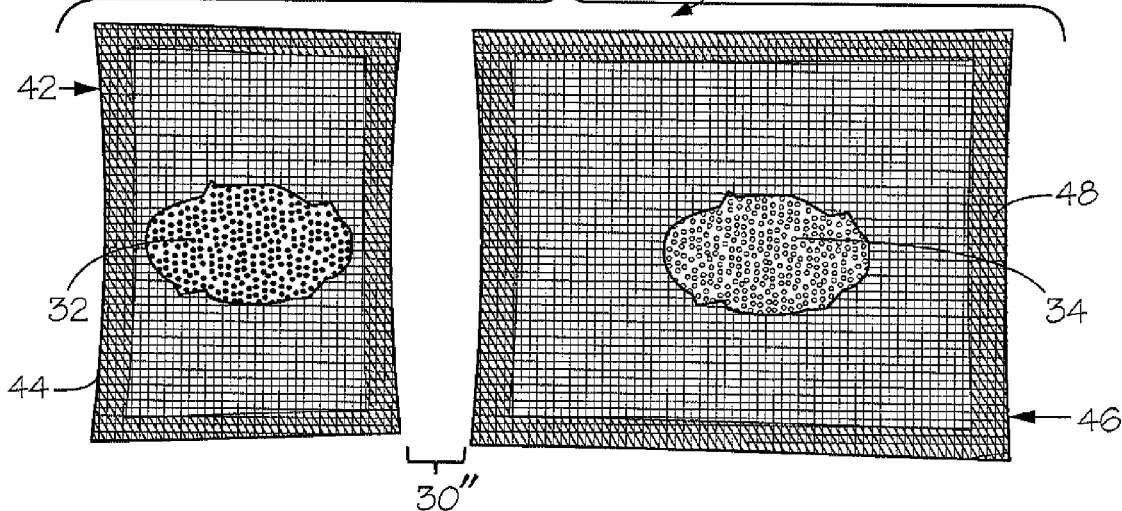
FIG. 6 is a plan view where the pouch includes two separate compartments.

FIG. 6 illustrates another embodiment of the invention wherein pouch 30" has tea 32 contained in a pouch 42 having a seam 44 around its edges. A sugar pouch 46 having a seam 48 which contains sugar 34. Compartment 46 is sealed in any suitable way, including the four-sided seal of FIG. 6. Tea pouch 42 is placed on top of sugar pouch 46, in much the same manner as with the folded tea sweetening brewing product A' as shown in FIG. 5. In regard to embodiments A' and A", it is important that the tea compartment or pouch lays on top of the sugar compartment or pouch for consistent tea. First, embodiment A is advantageous because larger granules of sugar are mixed in with the smaller particles of tea making the sugar dissolve easier and better. In addition, tea is extracted more fully in the blend because the granules reduce the compacting of the tea particles. The heat dissolves the sugar more completely in the sweet concentrated tea solution in the basket. The larger granules allow the hot water to flow around the granules at the same time as the tea is being extracted out of the tea particles. Two steps have been reduced to one. In the prior method, the sugar goes in after the tea has cooled in a two-step process.

In accordance with the invention, a method for brewing sweetened tea is disclosed comprising the steps of providing a tea brewing machine having a container, a brewing basket carried above the container, and a hot water dispenser for delivering hot water into the brewing basket. Next, the method includes placing a mesh pouch containing a prescribed blend of tea particles and sugar into the brewing basket, and dispensing hot water into the brewing basket to steep the tea particles and sugar in the brewing basket producing a flow of concentrated sweet tea solution out of the basket into the container. The concentrated sweet tea solution is added to a proportioned amount of water at a time after the sugar has been more completely and consistently dissolved in contrast to the sugar being dissolved in the tea solution after brewing.

Figure 7:
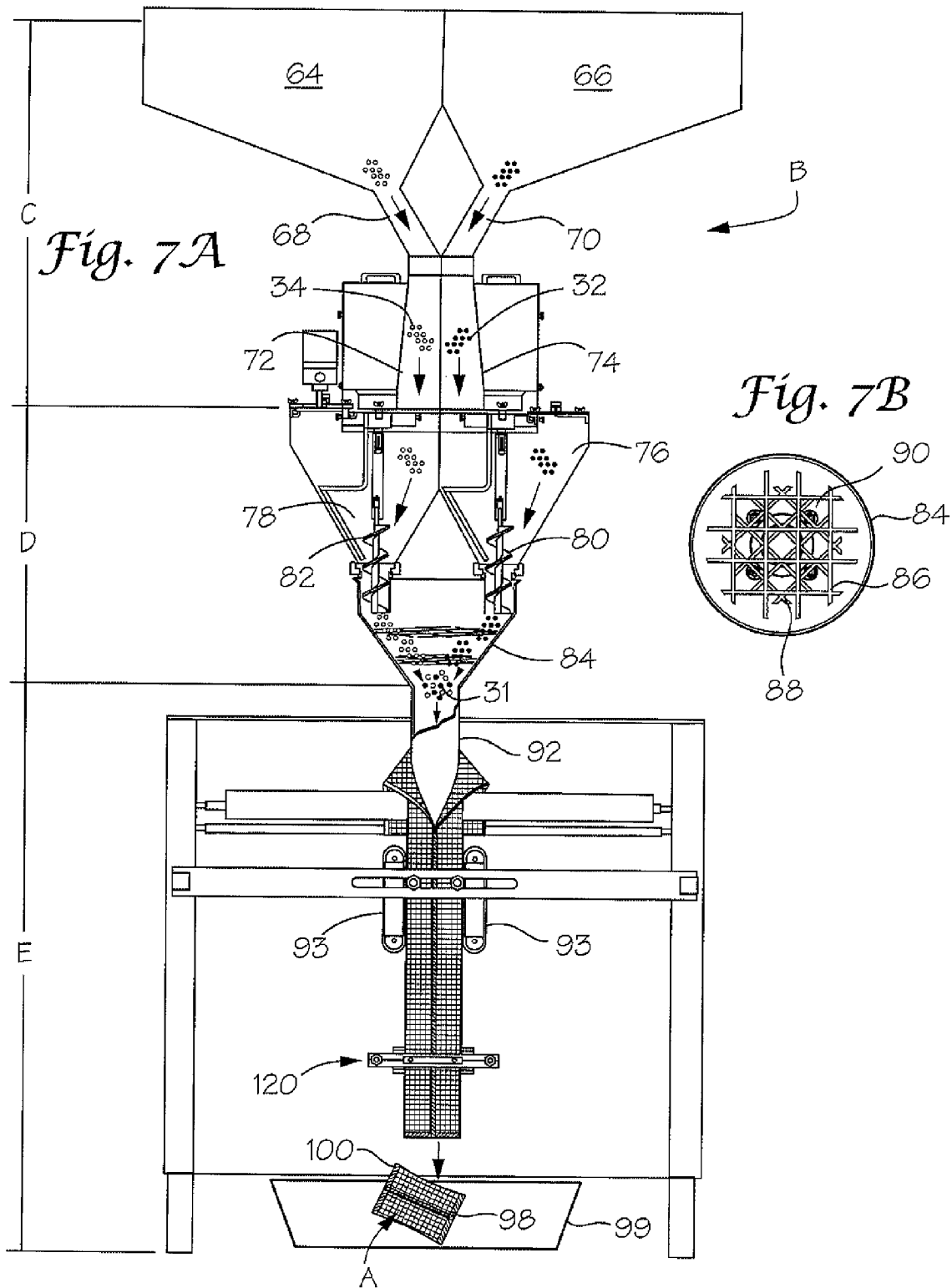
FIG. 7A illustrates a tea and sugar blending apparatus for apportioning and blending tea and sugar, and packaging the blend in a water permeable pouch.
FIG. 7B is a top plan view of a blending/dispensing funnel according to the present invention.
Figure 8:
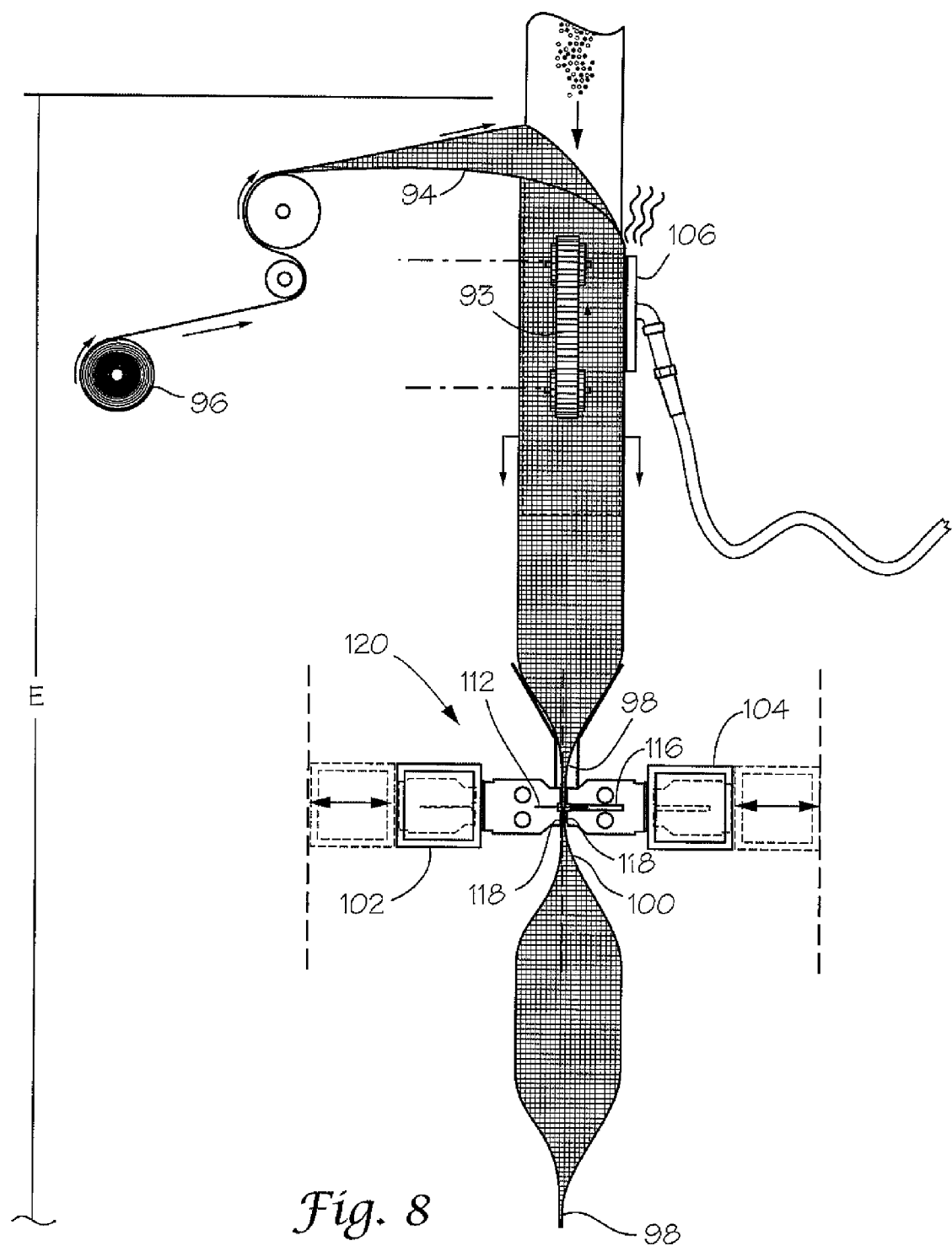
FIG. 8 is a side elevation illustrating a filling, sealing and cutting section for dispensing a tea particles and sugar granules blended into a mesh pouch, and sealing and cutting the top end after the pouch is filled.

Referring now to FIGS. 7A, 7B and 8, a system and method for producing the tea brewing and sweetening product A in pouch 30 will now be disclosed in more detail, along with the process for blending the tea and sugar, and packaging. As can best be seen in FIG. 7A, a blending apparatus, generally designated B, for feeding and blending tea 32 and sugar 34 is illustrated. Apparatus B includes a feeding section C having a separate tea bin 66, and a separate sugar bin 64 which separately deliver tea particles 32 and sugar granules 34 through conduits 68 and 70 through separate infeed ducts 72, 74, respectively. From the infeed ducts, tea particles 32 are delivered to a tea hopper 76 and sugar 34 is delivered to a sugar hopper 78 of blending section D. A feed auger 80 is located in tea hopper 76, and a feed auger 82 is located in sugar hopper 78. The augers meter or control the amounts of the tea particles and sugar granules being delivered by controlling the auger speeds, and hence the tea/sugar blend ratio. The preferred tea/sugar ratio is about ⅕ to ½₅, depending on the customer, with ¹⁄₁₆ being typical. The size of the tea particles varies with the customer's tea blend. Tea is widely available, for example, Henry P. Thompson Tea Company in Peapack, N.J., is a source and the specifications are for black, oolong, and green (including white tea). Generally, for most tea blends, 98% of the tea particles will be retained by a U.S. mesh sieve size of 80. Sugar granules are widely available, for example Torus Trading Company of Monterrey, Mexico. The portions of tea particles 32 and sugar granules 34 are fed into a blending and dispensing funnel 84 where the tea particles and sugar granules are blended and dispensed through a nozzle 86. As can best be seen in FIG. 7B, the blending and dispensing funnel 84 may include any arrangement or device for spreading and blending the tea particles and sugar granules. In the illustrated embodiment, funnel 84 includes a plurality of layers of wire grates 86 and 88 angularly oriented at angles with each other to provide irregular grate openings 90 for the blend delivered through the funnel. Funnel 84 includes a bottom opening through which the tea and sugar blend 31 is delivered to a conduit or nozzle 92. Packaging section E includes a tubular roll of mesh material 94 being fed downwardly, which may be either tubular or flat mesh material delivering from roll 96 to be seamed tubular. As the stock mesh material is drawn downwardly over nozzle 92, by roller conveyors 93, a side heating bar 106 seals the edges of the mesh material together. As in a typical vertical form, fill and seal machine, a pair of movable heating and cutting units 102, 104 are provided. Each unit includes heated sealing bars 118 above and below the respective knife blade 112 and knife slot 116. Sealing and cutting unit 104 includes knife blade 112, and sealing and cutting unit 102 includes knife slot 116 which receives the knife blade when the heat bars of the units are pressed together for sealing and the seam is then cut. Knife 112 extends into knife slot 116 of unit 104 to cut midway through the seam forming a top seam 100 for the pouch below and a bottom seam 98 for the pouch above.

As can best be seen in FIG. 8, tubular mesh material is initially sealed across the lower bottom end at 98 by the previous seal and cut operation, leaving the mouth open whereupon tea and sugar blend 31 goes down through nozzle 92 into pouch 30. The pouch is dropped into a bin 99 and conveyed away. The next material is delivered to the sealing/cutting station 120 and its lower end sealed at 98 by the previous seal and cut operation and with its mouth open. The next pouch at sealing/cutting station 120 is then filled and sealed across the top whereupon the next bottom seal 98 is formed at the same time. Horizontal form, fill, and seal machines can equally be used to produce product A, A', and A".

Thus, it can be seen that an advantageous product and process can be had according to the present invention for brewing tea and dissolving sugar granules together in a brewing basket. A concentrated sweet tea solution flows out of the brewing basket into the urn to mix with water, for consistently brewing sweet tea. Preferably, at least one pouch in the form of a fine polymeric mesh pouch retains the tea and sugar during brewing. One reason the sugar works in the present invention is the granular size (retained by U.S. mesh sieve 3-35). It is like sugar in the raw, but bigger. The tea and the sugar blended in the mesh pouch brew and sweeten the tea at the same time. The hot water entering the brew basket brews the tea, dissolves the sugar, and sweetens the tea. The key is the heat. The heat in the brewing basket dissolves all the sugar. The larger sugar granules allow the water to flow around it at the same time you are extracting tea from the tea in the blend. The steps of brewing tea in a pot or urn, and then adding sugar to the tea is replaced by one step, brewing the tea and sweetening with sugar at the same time before they reach the urn.

While a preferred embodiment of the invention has been described using specific terms, such description is for illustrative purposes only, and it is to be understood that changes and variations may be made without departing from the spirit or scope of the following claims.

What is claimed is:

1. A sweet tea brewing product for producing a concentrated sweet tea solution for mixing with a proportioned amount of water to make sweet tea comprising:
    at least one water permeable pouch for placement in a container;
    tea particles and sugar granules contained in said at least one mesh pouch;
    wherein said sugar granules include granules having a size in the range of U.S. mesh sieve nos. 3-35;
    said permeable pouch having openings being generally smaller than the size of said sugar granules and said tea particles for retention of said granules and particles; and
    so that said tea particles and sugar granules are extracted and dissolved in said container during steeping in hot water whereby a concentrated sweet tea solution is produced to be mixed with a proportioned amount of water for making sweet tea.

2. The product of claim 1 wherein said at least one permeable pouch is constructed from one of a polymer mesh, cotton mesh, and combination of a polymer and cotton material.

3. The product of claim 2 wherein said polymer mesh material includes one of nylon, polyester, polypropylene, and polyethylene mesh material.

4. The product of claim 2 wherein said mesh material has a mesh selected from a range of about 50 to 300 microns.

5. The product of claim 4 wherein the tea particles are retained by a U.S. mesh sieve no. 80.

6. The product of claim 2 wherein said at least one mesh pouch contains tea particles and sugar granules in a prescribed blend ratio.

7. The product of claim 6 wherein said at least one mesh pouch includes a mesh pouch containing said tea particles and sugar granules blended together in said blend ratio.

8. The product of claim 7 wherein said polymer material has a mesh selected from a range of about 50 to 300 microns.

9. The product of claim 6 wherein said a east one mesh pouch includes both said tea particles and said sugar granules.

10. The product of claim 6 wherein the blend ratio of tea to sugar is in the range of 1:5 to 1:25.

11. A method for brewing sweetened tea compirsing:
    providing at least one mesh pouch containing a prescribed blend of tea particles and sugar granules, said sugar granules including granules having a size in the range of U.S. mesh sieve nos. 3-35, and said mesh pouch having mesh openings being generally smaller than the size of said sugar granules and said tea particles for retention of said granules and particles;
    steeping said mesh pouch in hot water allowing the tea particles and sugar granules to infuse and dissolve to produce a hot concentrated sweet tea solution; and
    mixing said concentrated sweet tea solution with a proportion amount of water to produce a sweet tea for drinking wherein the sugar is more completely and consistently dissolved.

12. A sweet tea brewing product for producing a concentrated sweet tea solution for mixing with water to produce a sweet tea for drinking comprising:
    at least one water permeable pouch;
    tea particles and sugar granules contained in said at least one permeable pouch;
    wherein said sugar granules include granules having a size in the range of U.S. mesh sieve nos. 3-35;
    said permeable pouch having openings smaller than the size of said sugar granules and said tea particles for retention of said granules and particles; and
    said tea particles and sugar granules producing a concentrated sweet tea solution when steeped in hot water wherein said concentrated sweet solution may be mixed with a proportion amount of water to produce sweet tea for drinking.

* * * * *